United States Patent
Freiman et al.

(10) Patent No.: US 10,707,464 B2
(45) Date of Patent: Jul. 7, 2020

(54) BATTERY CELL VENTING SYSTEM FOR ELECTRIFIED VEHICLE BATTERIES

(71) Applicant: FORD GLOBAL TECHNOLOGIES, LLC, Dearborn, MI (US)

(72) Inventors: Joseph F. Freiman, Walled Lake, MI (US); Satish B. Chikkannanavar, Canton, MI (US); Bhaskara Boddakayala, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 770 days.

(21) Appl. No.: 14/859,693

(22) Filed: Sep. 21, 2015

(65) Prior Publication Data
US 2017/0084894 A1  Mar. 23, 2017

(51) Int. Cl.
*H01M 2/12* (2006.01)
*H01M 2/14* (2006.01)

(52) U.S. Cl.
CPC ........... *H01M 2/1252* (2013.01); *H01M 2/14* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2,027,310 A * | 1/1936 | Smith | ................... | H01M 2/043 429/126 |
| 2,341,382 A * | 2/1944 | Jensen | ................... | H01M 2/043 174/12 R |
| 6,033,795 A * | 3/2000 | Broussely | ............... | H01M 6/10 429/231.1 |
| 6,255,015 B1 | 7/2001 | Corrigan et al. | | |
| 8,084,152 B2 | 12/2011 | Hong et al. | | |
| 8,263,242 B2 | 9/2012 | Yebka et al. | | |
| 8,367,233 B2 | 2/2013 | Hermann et al. | | |
| 8,383,258 B2 | 2/2013 | Kim et al. | | |
| 8,507,118 B2 | 8/2013 | Aota et al. | | |
| 9,070,955 B2 | 6/2015 | Park et al. | | |
| 2002/0171390 A1* | 11/2002 | Kruger | ................ | B60L 11/1851 320/103 |
| 2005/0130033 A1* | 6/2005 | Iwamura | ............. | H01M 2/0245 429/159 |
| 2011/0217572 A1 | 9/2011 | Yebka et al. | | |
| 2013/0059181 A1 | 3/2013 | LePort et al. | | |
| 2014/0141293 A1* | 5/2014 | Urano | ................. | H01M 2/1241 429/56 |

FOREIGN PATENT DOCUMENTS

| | | | | |
|---|---|---|---|---|
| CN | 1707846 A | * | 12/2005 | ............. H01M 12/06 |
| JP | 60-039763 | * | 3/1985 | .............. H01M 2/38 |

* cited by examiner

*Primary Examiner* — Ula C Ruddock
*Assistant Examiner* — Tony S Chuo
(74) *Attorney, Agent, or Firm* — David B. Kelley; Carlson, Gaskey & Olds

(57) ABSTRACT

A battery cell according to an exemplary aspect of the present disclosure includes, among other things, a can assembly, an electrode assembly housed inside the can assembly and a venting system including a vent port and at least one of a vent tube inside the can assembly or a spacer plate mounted between the vent port and the electrode assembly.

15 Claims, 5 Drawing Sheets

BATTERY CELL VENTING SYSTEM FOR ELECTRIFIED VEHICLE BATTERIES

TECHNICAL FIELD

This disclosure relates to the venting of battery cells of an electrified vehicle battery pack.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells that store electric energy. From time to time, gaseous byproducts may be released by the battery cells, such as caused by encounters with off-normal conditions or environments. The battery cells may therefore include vents that allow the gaseous byproducts to escape from the interiors of the battery cells.

SUMMARY

A battery cell according to an exemplary aspect of the present disclosure includes, among other things, a can assembly, an electrode assembly housed inside the can assembly and a venting system including a vent port and at least one of a vent tube inside the can assembly or a spacer plate mounted between the vent port and the electrode assembly.

In a further non-limiting embodiment of the foregoing battery cell, the can assembly includes a casing and a top plate.

In a further non-limiting embodiment of either of the foregoing battery cells, the vent tube is attached to an interior wall of the casing.

In a further non-limiting embodiment of any of the foregoing battery cells, the vent tube is secured within a corner of the casing.

In a further non-limiting embodiment of any of the foregoing battery cells, the vent tube includes a first height that is less than a second height of a wall of the casing.

In a further non-limiting embodiment of any of the foregoing battery cells, the vent port is disposed in the top plate.

In a further non-limiting embodiment of any of the foregoing battery cells, the vent tube establishes a flow pathway between different portions of the can assembly.

In a further non-limiting embodiment of any of the foregoing battery cells, a plurality of vent tubes are mounted inside the can assembly and each establishing a flow pathway configured to communicate gaseous byproducts toward the vent port.

In a further non-limiting embodiment of any of the foregoing battery cells, the spacer plate is mounted to an underside of a top plate of the can assembly.

In a further non-limiting embodiment of any of the foregoing battery cells, the spacer plate is an arched sheet of material.

In a further non-limiting embodiment of any of the foregoing battery cells, at least one of the vent tube and the spacer plate includes a plurality of perforations.

In a further non-limiting embodiment of any of the foregoing battery cells, the venting system includes both of the vent tube and the spacer plate.

A battery pack according to another exemplary aspect of the present disclosure includes, among other things, a battery assembly that includes a plurality of battery cells. Each battery cell of the plurality of battery cells includes a venting system comprising a vent tube configured to establish a first flow pathway for communicating gaseous byproducts inside the battery cell and a spacer plate configured to establish a second flow pathway for communicating the gaseous byproducts.

In a further non-limiting embodiment of the foregoing battery pack, the venting system includes a vent port.

In a further non-limiting embodiment of either of the foregoing battery packs, the spacer plate is disposed between the vent port and an electrode assembly of the battery cell.

In a further non-limiting embodiment of any of the foregoing battery packs, each of the plurality of battery cells includes a can assembly including a casing and a top plate.

In a further non-limiting embodiment of any of the foregoing battery packs, the vent tube is disposed in a corner of the casing.

In a further non-limiting embodiment of any of the foregoing battery packs, the first flow pathway is a vertical flow pathway and the second flow pathway is a lateral flow pathway.

In a further non-limiting embodiment of any of the foregoing battery packs, at least one of the vent tube and the spacer plate includes a plurality of perforations.

In a further non-limiting embodiment of any of the foregoing battery packs, the vent tube is a hollow cylinder and the spacer plate is an arched sheet of material.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a venting system for venting gaseous byproducts that may accumulate inside battery cells of an electrified vehicle battery pack. An exemplary battery cell includes a can assembly, an electrode assembly housed inside the can assembly, and a venting system for venting the gaseous byproducts. The venting system may include a vent port and either a vent tube inside the can assembly or a spacer plate mounted between the vent port and the electrode assembly. In some embodiments, the venting system includes both the vent tube and the spacer plate. The proposed venting systems of this disclosure provide multiple flow pathways within the battery cell for facilitating venting of the gaseous byproducts. These and other features are discussed in greater detail in the following paragraphs of this detailed description.

Figure 1:
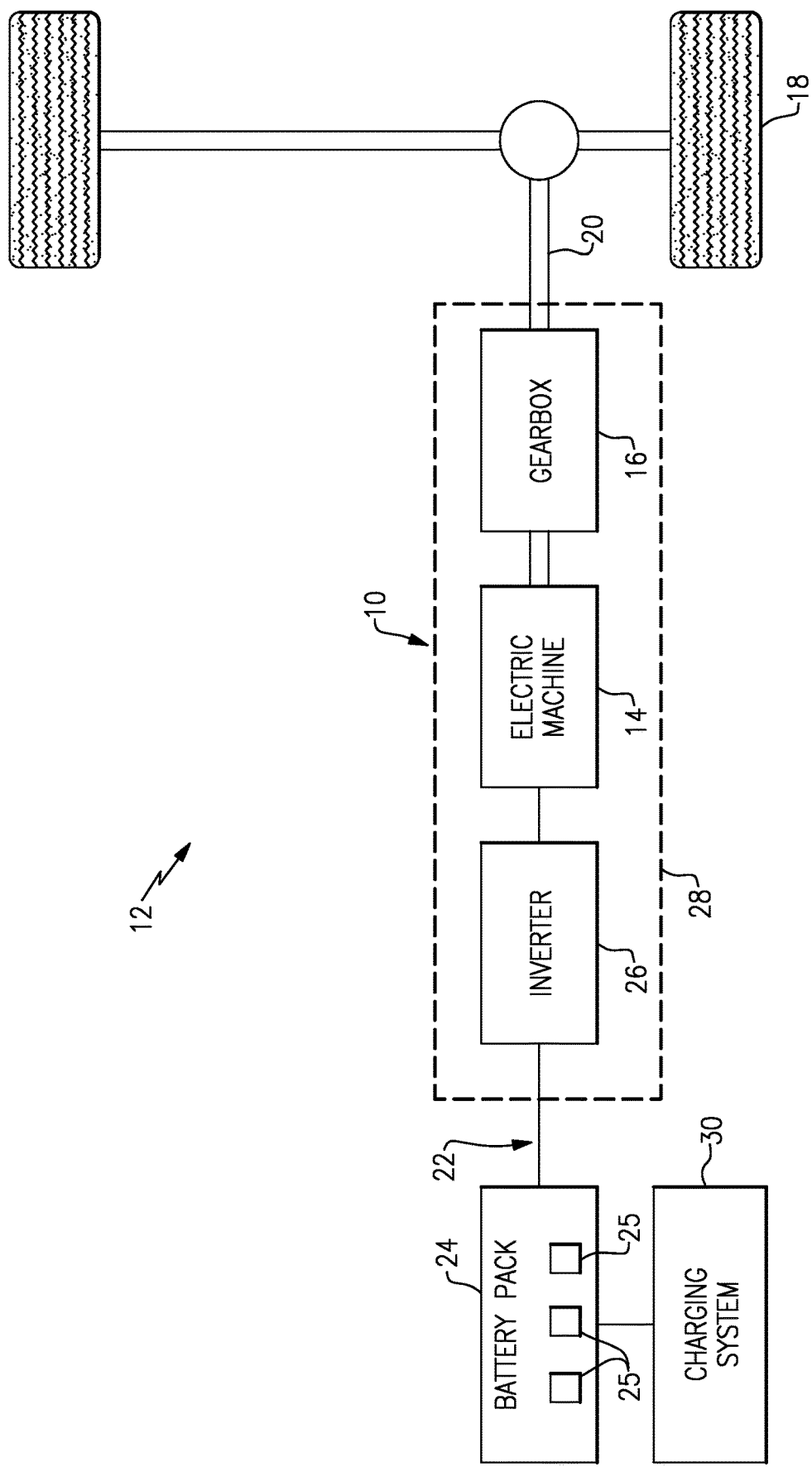
FIG. 1 schematically illustrates a powertrain of an electrified vehicle.

FIG. 1 schematically illustrates a powertrain 10 of an electrified vehicle 12. Although depicted as a battery electric vehicle (BEV), it should be understood that the concepts described herein are not limited to BEV's and could extend to other electrified vehicles, including but not limited to, plug-in hybrid electric vehicles (PHEV's) or full hybrid electric vehicles (FHEV). Therefore, although not shown in this embodiment, the electrified vehicle 12 could be equipped with an internal combustion engine that can be employed either alone or in combination with other energy sources to propel the electrified vehicle 12.

In one non-limiting embodiment, the electrified vehicle 12 is a full electric vehicle propelled solely through electric power supplied by an electric machine 14 without assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to power the electrified vehicle 12.

The electrified vehicle 12 may also include a charging system 30 for charging the energy storage devices (e.g., battery cells) of the battery pack 24. The charging system 30 may be connected to an external power source (not shown) for receiving and distributing power. The charging system 30 may also be equipped with power electronics for converting AC power received from the external power supply to DC power for charging the energy storage devices of the battery pack 24. The charging system 30 may also accommodate one or more conventional voltage sources from the external power supply (e.g., 110 volt, 220 volt, etc.).

The powertrain 10 of FIG. 1 is shown schematically and is not intended to limit this disclosure. Various additional components could alternatively or additionally be employed by the powertrain 10 within the scope of this disclosure.

Figure 2:
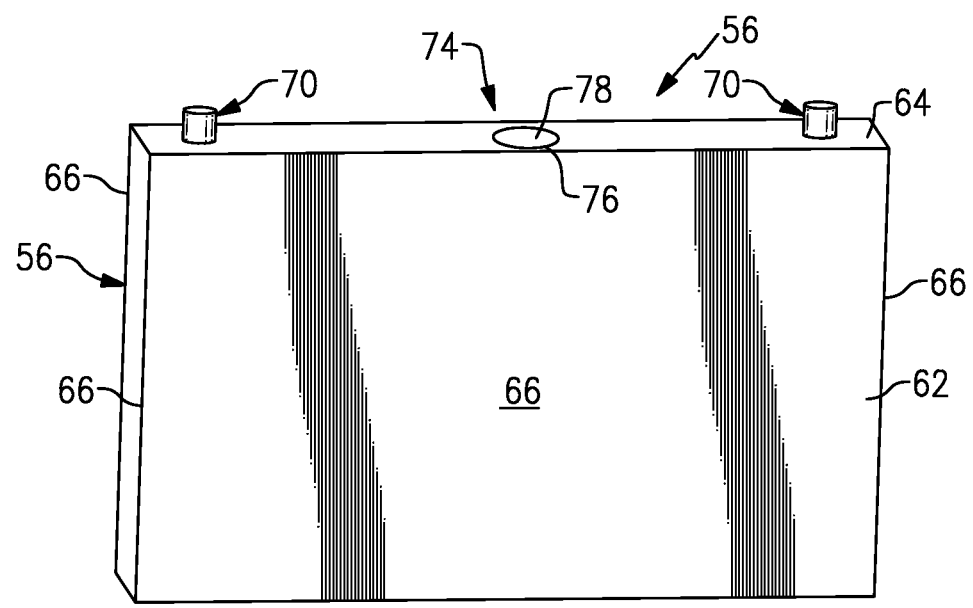
FIG. 2 illustrates a battery cell for use within a battery pack of an electrified vehicle.
Figure 3:
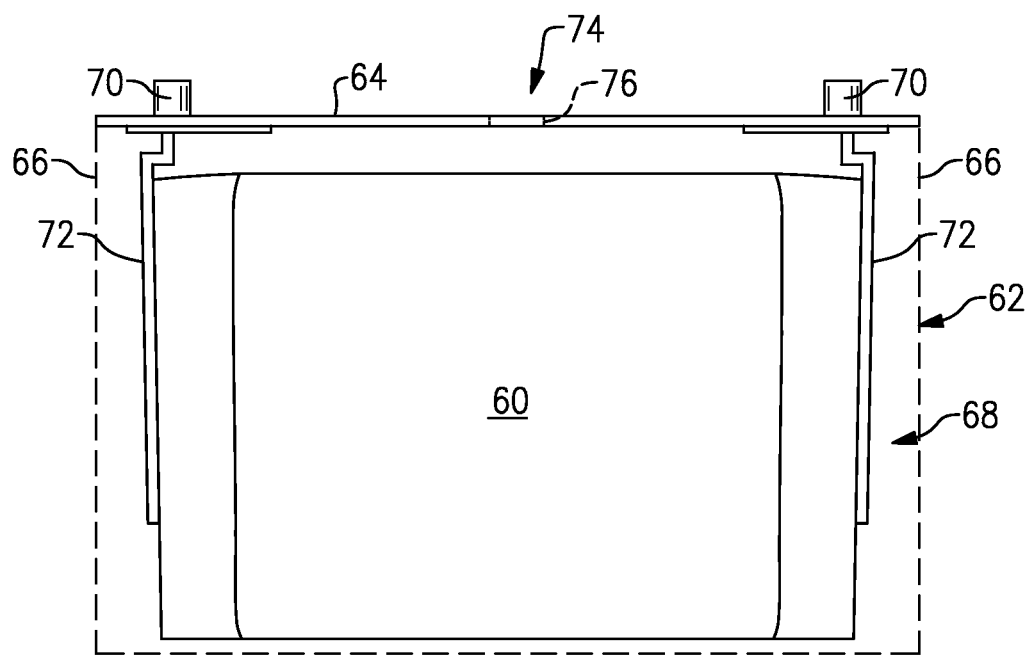
FIG. 3 illustrates the internal components of the battery cell of FIG. 2.

FIGS. 2 and 3 illustrate an exemplary battery cell 56 that may be employed within an electrified vehicle battery pack, such as the battery pack 24 of the electrified vehicle 12 of FIG. 1, for example. The battery cell 56 stores electrical energy for powering various electrical loads of the electrified vehicle 12. The battery pack 24 could employ any number of battery cells 56. For example, a plurality of the battery cells 56 may be stacked side by side along a longitudinal axis to construct a grouping of battery cells 56, sometimes referred to as a "cell stack" or "module." The battery pack 24 could also include multiple individual groupings of the battery cells 56.

In one non-limiting embodiment, the battery cell 56 is a prismatic, lithium-ion cell. However, battery cells having other geometries (cylindrical, pouch, etc.), other chemistries (nickel-metal hydride, etc.), or both, could also benefit from the teachings of the disclosure.

The exemplary battery cell 56 includes a can assembly 58 and an electrode assembly 60 housed inside the can assembly 58. In one non-limiting embodiment, the can assembly 58 includes a casing 62 and a top plate 64. The casing 62 includes a plurality of walls 66 that define an interior 68 for housing the electrode assembly 60. The top plate 64 of the can assembly 58 may be mounted to the casing 62. In one non-limiting embodiment, the top plate 64 is welded to the casing 62. The top plate 64 includes terminals 70 (e.g., one positive terminal and one negative terminal). Current collector bars 72 (see FIG. 3) are connected between the terminals 70 and current-collecting foil surfaces of the electrode assembly 60 within the interior 68 of the casing 62 (see FIG. 3). The addition of an electrolyte (e.g., liquid, gel or solid) allows ionic current flow between the active materials of each electrode.

The electrode assembly 60, sometimes referred to as a jelly roll, is formed by winding a positive electrode (e.g., a cathode) with an active coating, a negative electrode (e.g., an anode) with an active coating, and a separator inserted between the positive electrode and the negative electrode. The electrode assembly 60 may be wound about either a vertical or horizontal axis. Electrical current flows to and from the active materials of the positive and negative electrodes. The circuit is completed by ionic flow between the electrodes, as supported by the electrolyte.

The battery cell 56 may additionally include a venting system 74 for discharging gaseous byproducts from the interior 68. The gaseous byproducts may be released during a thermal runaway event in which a battery cell 56 heats up faster than the heat can be dissipated, for example. In one non-limiting embodiment, the venting system 74 includes a vent port 76 for discharging the gaseous byproducts. The vent port 76 may be covered with a membrane 78. During certain conditions, gaseous byproducts released from the electrode assembly 60 may be expelled from the interior 68 by communicating these byproducts through the vent port 76.

The exemplary venting system 74 may include various additional features for expelling the gaseous byproducts. The various venting system features discussed below establish multiple flow pathways for expelling the gaseous byproducts from the battery cell 56 and prevent the vent port 76 from becoming blocked. Incorporation of any or all of the exemplary venting features of this disclosure can mitigate pressure build-up inside the battery cell 56 during the rare occurrence of a thermal runaway event.

FIGS. 4A-4E illustrate additional features of the venting system 74 of the battery cell 56. In one non-limiting embodiment, the venting system 74 includes one or more vent tubes 80 that establish flow pathways 85 for directing gaseous byproducts GB (see FIG. 4A) along an unobstructed path toward the vent port 76. The vent tubes 80 may be secured within the interior 68 of the casing 62 of the battery cell 56. For example, the vent tubes 80 could be welded or brazed to the walls 66 on the interior 68 of the casing 62. In one non-limiting embodiment, the vent tubes 80 are made of a metallic material. Suitable metallic materials include, but are not limited to, steel and aluminum.

Figure 4A:
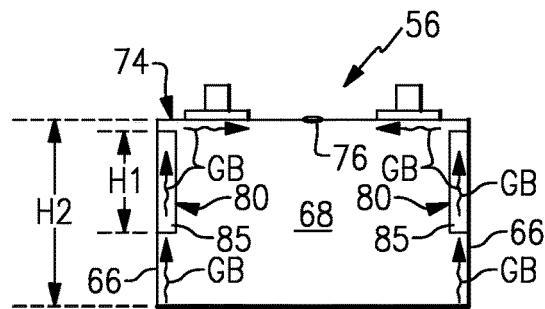
FIGS. 4A, 4B, 4C, 4D and 4E illustrate battery cell venting systems that include vent tubes.
Figure 4B:
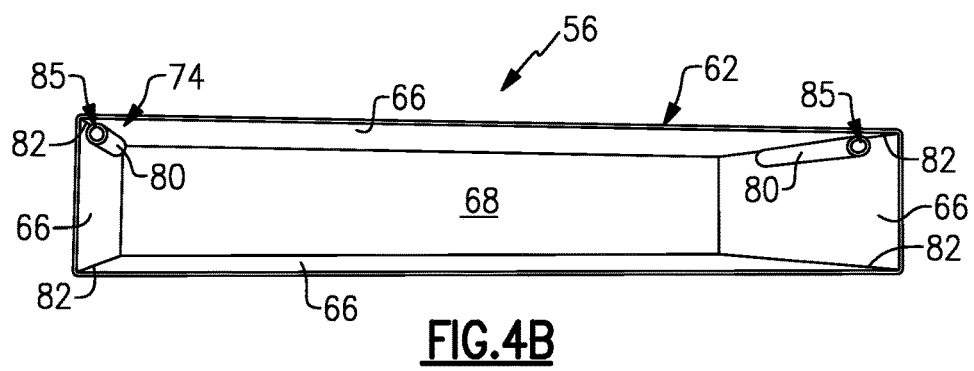
Figure 4C:
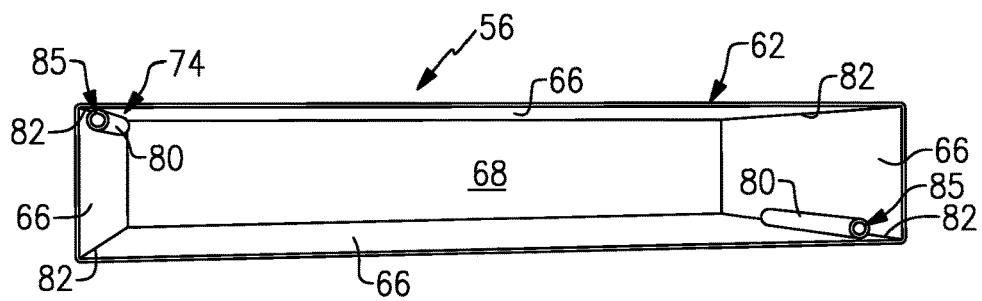
Figure 4D:
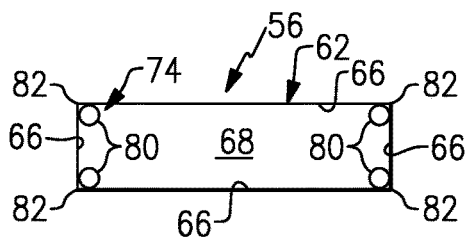
Figure 4E:
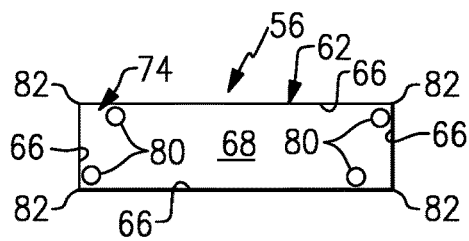

In another non-limiting embodiment, a height H1 of the vent tubes 80 is smaller than a height H2 of each wall 66 of the casing 62 (best shown in FIG. 4A). In this way, gaseous byproducts GB that accumulate in the bottom portion of the casing 62 may be freely vertically communicated through the vent tubes 80 toward the top plate 64, which is typically where the vent port 76 is located. In one non-limiting embodiment, the height H1 is ⅓ of the height H2. In another non-limiting embodiment, the height H1 is ½ of the height H2.

The vent tubes 80 may optionally be secured at one or more corners 82 of the casing 62. In one non-limiting embodiment, vent tubes 80 are located within the corners 82 on the same side of the casing 62 (see FIG. 4B). In another non-limiting embodiment, vent tubes 80 are disposed within opposite corners 82 of the casing 62 (see FIG. 4C). In yet another non-limiting embodiment, vent tubes 80 are positioned at each corner 82 of the casing 62 (see FIG. 4D). In still another non-limiting embodiment, the vent tubes 80 are secured to the walls 66 of the casing 62 at locations that are spaced from the corners 82 (see, for example, FIG. 4E).

Figure 4F:
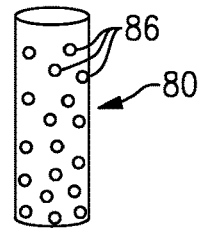
FIG. 4F illustrates an exemplary vent tube of a battery cell venting system.

The vent tubes 80 may embody any size or shape. In one non-limiting embodiment, the vent tubes 80 are configured as hollow cylinders for establishing the flow pathways 85. In another non-limiting embodiment, the vent tubes 80 include a plurality of perforations 86 (see FIG. 4F) for ensuring free flow of the gaseous byproducts GB even if portions of the vent tubes 80 become blocked by solid electrode debris or other debris.

Figure 5:
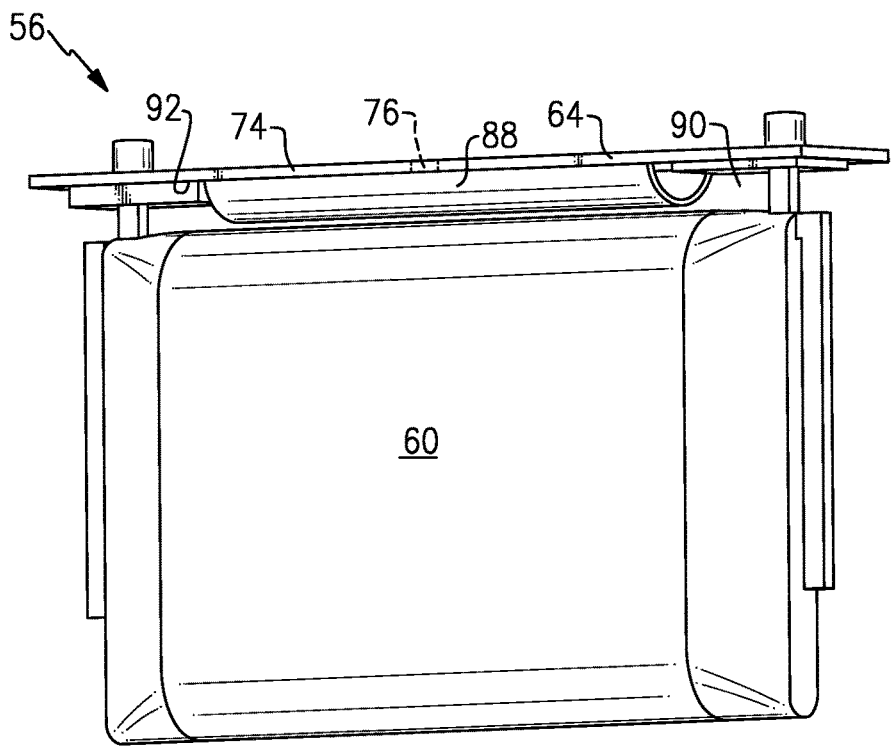
FIG. 5 illustrates a battery cell venting system according to another embodiment of this disclosure.

In another embodiment, shown in FIG. 5, the venting system 74 includes a spacer plate 88 for preventing blockage of the vent port 76. In one non-limiting embodiment, the venting spacer plate 88 is mounted in a gap 90 that extends between the vent port 76 and the electrode assembly 60. In another non-limiting embodiment, the spacer plate 88 is mounted to an underside 92 of the top plate 64. The spacer plate 88, which may be made of a metallic material, may be welded or otherwise secured to any portion of the battery cell 56.

The spacer plate 88 is a rigid sub-structure mounted inside the battery cell 56 to ensure the reliable, unobstructed flow of gaseous byproducts toward the vent port 76. In one non-limiting embodiment, the spacer plate 88 is configured as an arched sheet of material. Other shapes are also contemplated within the scope of this disclosure.

Figure 6:
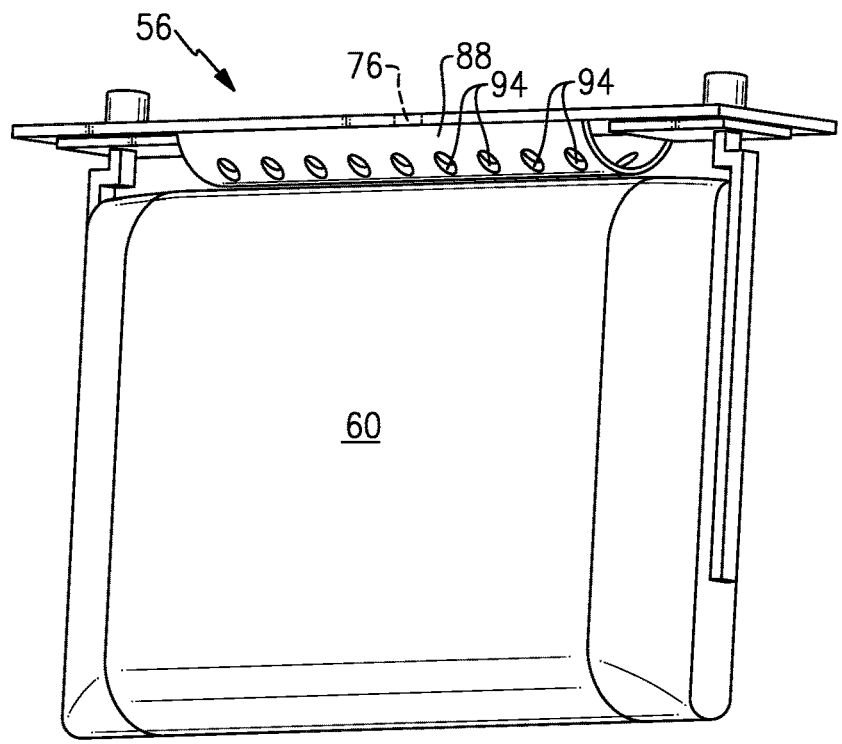
FIG. 6 illustrates a battery cell venting system according to yet another embodiment of this disclosure.

In yet another non-limiting embodiment, the spacer plate 88 includes a plurality of perforations 94 (see FIG. 6). The perforations 94 ensure the free flow of gaseous byproducts even if portions of the spacer plate 88 become blocked by solid electrode debris or other debris.

Figure 7:
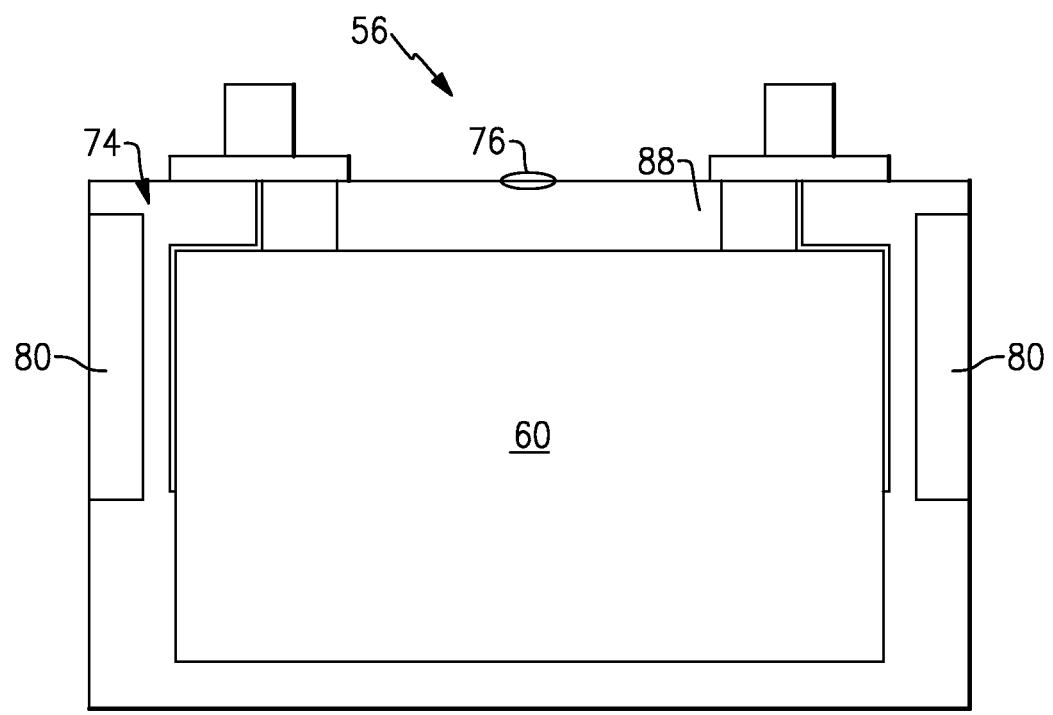
FIG. 7 illustrates a battery cell venting system according to yet another embodiment of this disclosure.

In yet another non-limiting embodiment, shown in FIG. 7, the venting system 74 includes both vent tubes 80 and the spacer plate 88. The vent tubes 80 may establish vertical flow pathways for directing gaseous byproducts toward the vent port 76 (i.e., from the bottom toward the top of the battery cell 56), whereas the spacer plate 88 may prevent blockage of the vent port 76 and establish lateral flow pathways for communicating the gaseous byproducts should the electrode assembly 60 expand during a thermal runaway event.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery cell, comprising:
a can assembly;
an electrode assembly housed inside said can assembly; and
a venting system including a vent port, at least one of a vent tube extending completely inside said can assembly, and a spacer plate mounted between said vent port and said electrode assembly, wherein said spacer plate is spaced from and unconnected to said at least one vent tube,
wherein said spacer plate is mounted to an underside of a top plate of said can assembly.

2. The battery cell as recited in claim 1, wherein said can assembly includes a casing and said top plate.

3. The battery cell as recited in claim 2, wherein said vent tube is attached to an interior wall of said casing.

4. The battery cell as recited in claim 2, wherein said vent tube is secured within a corner of said casing.

5. The battery cell as recited in claim 2, wherein said vent tube includes a first height that is less than a second height of a wall of said casing.

6. The battery cell as recited in claim 2, wherein said vent port is disposed in said top plate.

7. The battery cell as recited in claim 1, wherein said vent tube establishes a flow pathway between different portions of said can assembly.

8. The battery cell as recited in claim 1, wherein said spacer plate is an arched sheet of material.

9. The battery cell as recited in claim 1, wherein at least one of said vent tube and said spacer plate includes a plurality of perforations.

10. The battery cell as recited in claim 1, wherein said battery cell is a prismatic, lithium-ion cell.

11. The battery cell as recited in claim 1, wherein said electrode assembly includes a jelly roll.

12. The battery cell as recited in claim 1, wherein said vent port is covered with a membrane.

13. A battery cell, comprising:
a can assembly;

an electrode assembly housed inside said can assembly; and a venting system including a vent port, at least one of a vent tube extending completely inside said can assembly, and a spacer plate mounted between said vent port and said electrode assembly, wherein said spacer plate is spaced from and unconnected to said at least one vent tube, wherein said at least one vent tube includes a plurality of vent tubes mounted inside said can assembly and each establishing a flow pathway configured to communicate gaseous byproducts toward said vent port.

14. A battery cell, comprising:

a can assembly;

an electrode assembly housed inside said can assembly; and a venting system including a vent port, at least one of a vent tube extending completely inside said can assembly, and a spacer plate mounted between said vent port and said electrode assembly, wherein said spacer plate is spaced from and unconnected to said at least one vent tube, wherein said spacer plate includes a width that is less than a width of the electrode assembly.

15. A battery cell, comprising:

a can assembly;

a lithium-ion electrode assembly housed inside said can assembly; and a venting system including:

a vent port;

a plurality of vent tubes mounted inside said can assembly and each establishing a vertical flow pathway configured to communicate gaseous byproducts toward said vent port; and a spacer plate mounted between said vent port and said electrode assembly and establishing a lateral flow pathway for the gaseous byproducts.

* * * * *